July 27, 1965 E. S. JOHANSON 3,197,288
CATALYTIC REACTOR
Filed May 29, 1961
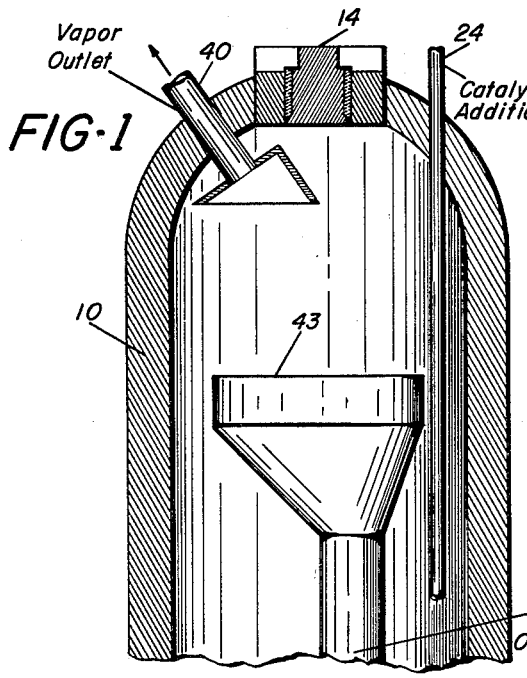
FIG·1
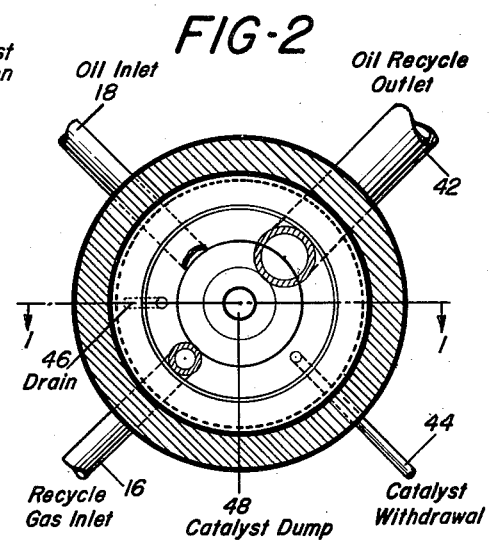
FIG·2
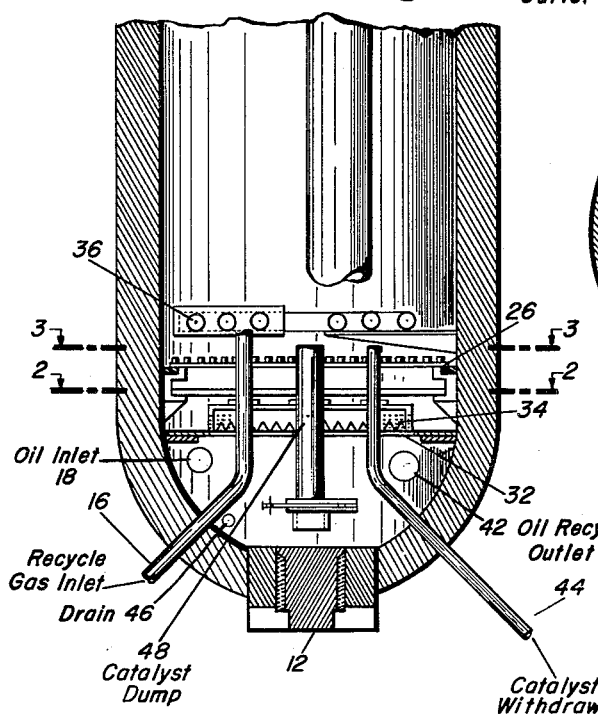
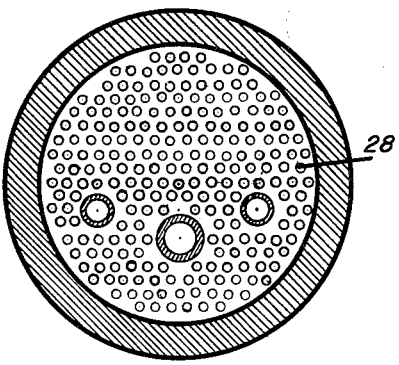
FIG·3
FIG·4
INVENTOR.
EDWIN S. JOHANSON
BY Nathaniel Ely
Attorney

United States Patent Office 3,197,288
Patented July 27, 1965

3,197,288
CATALYTIC REACTOR
Edwin S. Johanson, Princeton, N.J., assignor to Hydrocarbon Research, Inc., New York, N.Y., a corporation of New Jersey
Filed May 29, 1961, Ser. No. 113,539
3 Claims. (Cl. 23—289)

This invention relates to a reactor for contacting a liquid and a gaseous material in the presence of particulate solids which are maintained in random motion to become a so called "ebullated bed."

In my co-pending application, Serial No. 743,304, filed June 20, 1958 now U.S. Patent No. 2,987,465, I have disclosed the importance of contacting liquids such as hydrocarbons with gases such as hydrogen in the presence of particulate solids which may be catalytic for bringing about a reaction such as hydrogenation, hydrosulfurization, etc. While my disclosure includes other types of reactions, the fundamental characteristic is the passage of the gas and liquid in continuous liquid phase upwardly through a relatively deep bed of particulate solids at such a flow rate, based on the size and density of the particulate solids and the viscosity and density of liquid, that the bed is expanded at least 10% and usually not to exceed 300% over the volume which is occupies in a settled state. In such an operation described as an "ebullated bed," it is found that the liquid and gas tend to establish a random motion of the particles in the liquid which improves contact, increases yields, prevents agglomeration and increases the effective length of runs. The scouring action of the particles on each other and on the wall of the reactor is especially beneficial.

My present invention is drawn to the reactor in which such an ebullated bed is accomplished, it being understood that in many reactions and particularly the hydrogenation of hydrocarbons, pressures in the order of 4000 p.s.i.g. and even higher may be required.

More specifically, my invention relates to an improved support for the particulate solids which permits a free upward flow of the gases and liquids and any entrained solids without permitting the back flow of the particulate solids.

Further objects and advantages of my invention will appear from the following description of a preferred form of embodiment thereof taken in connection with the attached drawing which is illustrative of the invention and in which:

FIGURE 1 is a substantially central vertical section with parts in elevation showing the reactor construction.

FIGURE 2 is a horizontal section taken substantially on the line 2—2 of FIGURE 1 showing the bottom connections.

FIGURE 3 is a horizontal cross section taken substantially along the line 3—3 of FIGURE 1 showing the top of the bubble tray.

FIGURE 4 is an elevation on an enlarged scale with parts in section of a bubble cap.

The reactor generally indicated at 10 is preferably a forged pressure vessel having a bottom closure member 12 and a top closure member 14. These are suitably secured to the vessel in a manner to be completely gas tight under the high pressures customarily employed with hydrogenation reactions. It is to be understood that the closure members 12 and 14 are of such a size that they will permit a man to enter the vessel and accomplish the welding of structures as hereinafter described.

From an operating standpoint, the reactor as shown in FIGURE 1 is primarily adapted to carry out a hydrogenation reaction on a hydrocarbon oil as for example the removal of sulfur and other impurities from a reduced crude or residuum. This is accomplished in the presence of particulate solids which, as described in my co-pending application above mentioned, usually are in the range of 2 to 60 mesh and more frequently have an average dimension of approximately 1/32″. These have a normal density of from about 30 to 150 pounds per cubic foot and require a liquid flow (of hot hydrocarbon oil feed) of from 20 to 120 gallons per minute per square foot of horizontal reactor cross section. The size and shape of the particles used in any specific process will depend on the conditions of that process including the density, viscosity and velocity of the liquid involved and, of course, the size, shape and density of the particles themselves. Generally, for proper ebullation, the solids are screened to be of a single uniform size within the error of commercial practice which is commonly plus or minus 25% of the average length and minus or plus 5% of the diameter in the case of extruded cylinders, minus or plus 10% of the average diameter in the case of spheres, minus or plus 5% of the average length and diameter in the case of pellets, and minus or plus 2 mesh sizes of the average in the case of granules.

The catalyst or other types of particulate solids are introduced to the reactor through the line 24, such catalyst resting on the perforated deck 26 which as shown in FIGURE 3 is provided with a plurality of bubble caps 28 which surmount the perforations in the deck.

One form of bubble cap is schematically shown in FIGURE 4 as mounted on the usual riser 30. The deck 26 as shown therein is provided with a perforation 26a and the riser 30 provided with the opening 30a which permits the liquid and gas to pass up through the deck 26 and through the riser 30 and thence down under the serrated edge 28a on the bubble cap 28 after which the liquid and gas pass upwardly through the bed.

The bubble cap has the advantage not only that the slots 28a aid in distribution of the feed but also that the cap overlies the opening in such a manner as to maintain an unfavorable angle of repose that will prevent the solids from flowing downwardly through the deck. However, the openings are such that dust or ash in the feed material, slurried catalyst, or other solid, will freely pass upwardly in the liquid carrying medium. It will also freely pass any catalyst in a recycle stream without a filtration as exists with a screen.

While it is not always necessary, I find it desirable in many instances to use a secondary distributor deck 32 provided with a vertical perforated distribution plate with serrations at the bottom edge 34 which thus more uniformly distributes the liquid and gas from the bottom of the reactor from the oil inlet 18 over the entire bubble deck 26.

Usually, the oil entering inlet 18 is adapted to have with it some or all of the gaseous reactants which are required. In such a case, the gas entering inlet 16 which is distributed by the distributor 36 across the bed above the bubble deck 26 may be a recycle gas or a control gas.

Gas or vapors are discharged from the upper part of the reactor through the outlet 40.

The liquid effluent may be removed through the conduit 42, the top 43 of which is preferably mounted above the level 22 of the expanded solids so that substantially only liquid is withdrawn. The liquid discharge from line 42 is carried out as shown in FIGURE 2 and while not herein shown, a portion may be passed through suitable heating, cooling, filtering, or other steps to render it suitable as recycle for reintroduction through the oil inlet 18. In a hydrocarbon hydrogenation it may be possible, as with certain distillates, to operate in a once through manner although usually it is found desirable to recirculate up to thirty-five times as much material as is normally carried within the reactor.

If it is found desirable to continuously withdraw catalyst from the reaction zone, this can be accomplished through line 44. The drain 46 may be used for liquid or solids, it being noted that a catalyst dump 48 and valve is provided when it is desirable to clean out the reactor.

In the present construction, a single chamber, or single reactor is shown, although it will be understood that in many of the ebullated bed reactions, particularly as described in the Keith-Layng application, Serial No. 737,711, now U.S. Patent No. 2,987,467, and in the Schuman application, Serial No. 786,490, now U.S. Patent No. 3,050,459 it is usually found desirable to carry out reactions in two or more stages which may be either two separate vessels or one vessel having a bubble deck intermediate top and bottom to establish an upper zone and a lower zone.

A bubble deck having risers and caps is the most practical and simple construction for establishing a free upflow without solids return. It is, of course, possible to mount a cap of such diameter with respect to the opening in the deck that downflowing solids will form an angle of repose such that they will not go through the openings. I find, however, that the use of several hundred very small bubble caps in a reactor cross section of about six feet will improve contacting, not increase pressure drop and will effectively prevent any substantial downward movement of solids.

While I have shown and described a preferred form of embodiment of my invention, I am aware that modifications may be made thereto and I, therefore, desire a broad interpretation of my invention within the scope and spirit of the disclosure herein and of the claims appended hereinafter.

I claim:

1. A reactor for a liquid-solids-gaseous reaction wherein the liquid and gas in continuous phase pass upwardly through the solids to cause an expansion of the solids of at least 10% based on the settled volume thereof, and wherein the solids are maintained in random motion in the liquid without substantial carryover from the reactor which comprises a substantially vertical vessel adapted to contain said solids, a perforated plate in said vessel below said solids, means to feed gas and liquid below said perforated plate and through the perforations in said plate at a velocity to maintain said solids in random motion in the liquid, covering elements superposed over all of said perforations in said plate, said covering elements having a horizontal component as compared to their horizontal spacing on the perforated plate such as to maintain an unfavorable angle of repose of the solids that will prevent the solids from flowing downwardly through the perforated plate, said covering elements being adapted to substantially uniformly distribute the liquid-gas mixture across the horizontal cross-section of the reactor, said reactor having a supplementary gas distributor mounted above the covering elements in the lower part of the reactor, said supplementary gas distributor being interconnected to gas inlet means for upward flow of gas through the liquid.

2. A reactor as claimed in claim 1 having a solids draw-off extending to a point above the perforated plate.

3. A reactor as claimed in claim 1 in which the covering elements include a riser and a bubble cap, the lower edge of said bubble cap serving as a fluid distributor to the reaction zone.

References Cited by the Examiner

UNITED STATES PATENTS

| 2,737,475 | 3/56 | Voorhies | 23—288.3 |
| 2,855,273 | 10/58 | Evans et al. | 23—288.3 |

FOREIGN PATENTS

| 521,712 | 8/53 | Belgium. | |

MORRIS O. WOLK, *Primary Examiner.*

MAURICE A. BRINDISI, *Examiner.*